United States Patent [19]

Ecer

[11] Patent Number: 5,417,010
[45] Date of Patent: May 23, 1995

[54] LIGHT WEIGHT SEEDING SHEET

[76] Inventor: Gunes M. Ecer, P.O. Box 4025, Thousand Oaks, Calif. 91359

[21] Appl. No.: 102,419

[22] Filed: Aug. 9, 1993

[51] Int. Cl.6 .............................................. A01C 1/04
[52] U.S. Cl. ................................................... 47/56
[58] Field of Search ............................. 47/56, 95

[56] References Cited

U.S. PATENT DOCUMENTS

| | | | |
|---|---|---|---|
| 3,812,618 | 5/1974 | Wood | 47/56 |
| 3,863,388 | 2/1975 | Loads | 47/56 |
| 4,283,880 | 8/1981 | Fjeldsa | 47/56 |
| 5,009,031 | 4/1991 | Knop et al. | 47/64 |
| 5,033,231 | 6/1991 | Sakate et al. | 47/56 |
| 5,097,625 | 3/1992 | Kaneko et al. | 47/56 |

FOREIGN PATENT DOCUMENTS

| | | | |
|---|---|---|---|
| 2358931 | 6/1974 | Germany | 47/56 |
| 3816865 | 11/1989 | Germany | 47/56 |
| 4022413 | 1/1992 | Germany | 47/56 |
| 3191703 | 8/1991 | Japan | 47/56 |
| 3250120 | 11/1991 | Japan | 47/56 |
| 3290525 | 12/1991 | Japan | 47/56 |
| 447026 | 2/1992 | Japan | 47/56 |
| 523013 | 2/1993 | Japan | 47/56 |
| 2142213 | 1/1985 | United Kingdom | 47/56 |

*Primary Examiner*—Henry E. Raduazo
*Attorney, Agent, or Firm*—William W. Haefliger

[57] ABSTRACT

This invention provides a light weight seeding sheet consisting of a flexible reticulate sheet, such as plastic mesh or burlap cloth, permeable by blades of vegetative crops, a bonding agent applied to one side of the reticulate sheet holds a uniform distribution of particles of fertilizers, seeds, and other plant growth additives in pre-measured amounts per unit area of the reticulate sheet. Seeds, fertilizers, and other chemical additives may be covered with a water soluble or a water dispersible parting means, such as a tissue paper or a water soluble polymer film. The parting means prevents sticking of the bonding agent to the unseeded face of the reticulate sheet when the light weight seeding sheet is wound into a roll. Because the light weight seeding sheet thus constructed does not contain any fillers, it is very flexible and may be easily cut to shape, is light weight, and simplifies planting. Many rolls of the sheet sufficient to cover large areas may be easily transported.

3 Claims, 2 Drawing Sheets

LIGHT WEIGHT SEEDING SHEET

BACKGROUND OF THE INVENTION

(1) Field of Invention

The present invention relates to a light weight, flexible seeding sheet. More specifically, the present invention relates to a reticulate sheet having an adhesively coated side onto which are attached grain or other vegetation seeds and fertilizer particles uniformly distributed, suitable for use on residential yards, and for seeding soils subject to erosion.

(2) Description of the Prior Art

Woven cloth, such as natural burlap, has been used for seeding and erosion control usually by covering over newly-seeded areas. Under a burlap cover seedlings get off to a vigorous start by holding moisture, and providing shade for seedlings. In this practice, much work is left to the consumer: fight types of seeds and fertilizers must be selected and uniformly distributed over the ground before a burlap cover is laid over. Even with the use of a seed/fertilizer spreader, uniformity of seed and fertilizer distribution is rarely achieved. Consumers will certainly prefer a product that takes the guess-work out of seeding or repairing of their lawns.

Carpet-like soil covers have been used in the past for variety of purposes including seeding. None of the seeding sheet products described in the prior an deals directly with all the concerns of residential consumers whose requirements for a seeding sheet mainly relate to its ease of use, ease of transportation, ease of handling and cutting to shape, low cost, and its low weight. Additional requirements such as uniform distribution of seeds, fertilizers and other additives, ability of the seeding sheet to prevent soil erosion on slopes, to provide a cover under which seeds can germinate without being picked by birds, and to preserve moisture are provided by the seeding sheets and the like described in the prior art.

A peat paper for use as a soil-improving material in connection with planting and weed control has been described in the U.S. Pat. No. 4,283,880 by Fjeldsa. The paper consists of peat fibers, cellulose fibers and a bonding agent. Cellulose fibers in form of a sheet or webb support loose peat fibers which are dry bonded to the cellulose fibers. The peat paper may contain additives such as hormones, fertilizers, chemicals, or seeds. Such seeding papers, as described in the subject patent, are too thick to be cut easily by an ordinary pair of scissors, and have a relatively loose peat layer in the middle which, despite the intended simplicity, makes this product somewhat difficult to handle.

A mat-like lawngrass, described by Knop and Van Banning in the U.S. Pat. No. 5,009,031, comprises of a layer of mineral fibers cross-linked to one another by cured binding agent and treated by hydrophilic wetting agent. This is a growth medium into which roots of a plant can penetrate in a controlled manner.

Sakate, Shibata, Tamura, and Tsuyama in the U.S. Pat. No. 5,033,231 describe a net for encouraging the growth of vegetation on the slope of a ground surface. The net consisting of tape-like wefts and warps for achieving a desired texture of geometrical slots less than the width of the wefts and a thin cotton sheet adhered to the net, the cotton sheet having desired seeds and fertilizers adhered thereto. Here, the net with an elaborate and specific architecture provides a certain texture for seeds to germinate through, and mountain and valley portions in the sheet for prevention of erosion on slopes. Fabrication of such a net should be an added cost which may not be desired by a residential customer who simply wants to seed his/her backyard regardless of the seeding texture (geometry).

Kaneko, et. al., in the U.S. Pat. No. 5,097,625 describe a seeding and seedling growing sheet for growing of grain, vegetables, and the like. The sheet comprising an adhesive agent layer on a sheet-like base material, wherein the adhesive agent layer contains a powdery ferromagnetic substance to promote growth at germination. Seeds may be placed on the adhesive agent coated face of the sheet, and the adhesive sheet may be placed on a mat or a seedling growing bed to germinate seeds and grow seedlings.

Loads in the U.S. Pat. No. 3,863,388 describes a method of growing grass in which grass seeds are mixed with a rooting medium and distributed over a reticulate structure such as a plastic mesh. An impermeable layer in the reticulate structure prevents the grass roots from extending downward and thereby causes the roots to bind the structure together to form a thin grass bearing lamina. Thus, Loads provides a sheet structure in which to germinate and grow seedlings before the sheet structure is transported and laid in its final earth surface destination.

None of the above prior art examples provide the simplicity, therefore the low product cost, of the present invention. While they may provide useful applications, none are as suited for use by the residential customer as the present invention is. Most provide a seed containing sheet, yet some are too elaborate and are thus costly (such as U.S. Pat. Nos. 5,033,231 and 5,097,625), and others (such as U.S. Pat. Nos. 4,283,880 and 3,863,388, and 5,009,031) provide structures that would be difficult to cut with a pair of ordinary household scissors, and more difficult to transport than the seeding sheet provided by the present invention.

OBJECTS AND SUMMARY OF THE INVENTION

It is an object of the present invention to provide a light weight seeding sheet which can provide a uniform distribution of seeds, fertilizer particles, and other crop growth additives for planting of vegetative crops.

It is another object of the present invention to provide a light weight seeding sheet which helps prevent erosion of soil.

It is another object of the present invention to provide a light weight seeding sheet which is low cost.

It is yet another object of the present invention to provide a light weight seeding sheet which is easily cut to shape using ordinary household scissors.

To accomplish these objectives this invention provides a light weight seeding sheet consisting of a flexible reticulate sheet, such as plastic mesh or burlap cloth, permeable by blades of vegetative crops, a bonding agent applied to one side of the reticulate sheet holds a uniform distribution of particles of fertilizers, seeds, and other plant growth additives in pre-measured amounts per unit area of the reticulate sheet. Seeds, fertilizers, and other chemical additives may be covered with a water soluble or a water dispersible material layer, such as a tissue paper or a water soluble polymer film. The cover layer prevents sticking of the bonding agent to the unseeded face of the reticulate sheet when the seeding sheet is wound into a roll. Because the seeding sheet thus constructed does not contain any fillers, it is very flexible and may be easily cut to shape, is light weight, and simplifies planting. Many rolls of the sheet sufficient to cover large areas may be easily transported.

These and other objects, advantages and features of the invention will become apparent from the following detailed description, drawings, and claims.

DETAILED DESCRIPTION OF THE INVENTION

Figure 1:
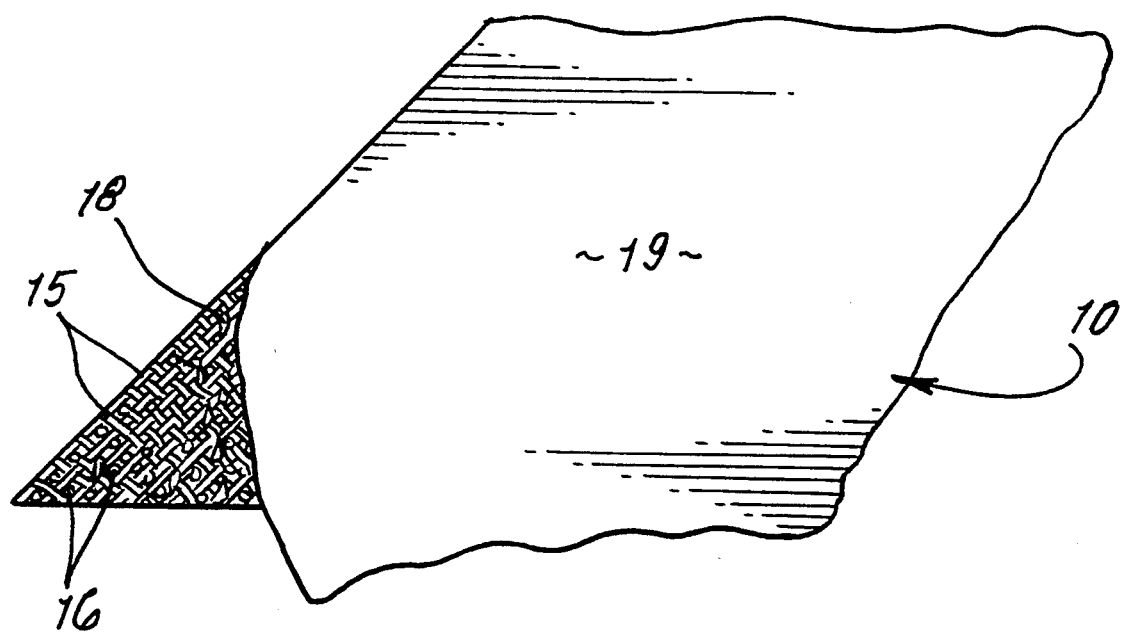
FIG. 1 is a perspective view of light weight seeding sheet, parting means partly lifted to show seed-fertilizer mixture attached to inside surface of reticulate sheet, according to the present invention.
Figure 2:
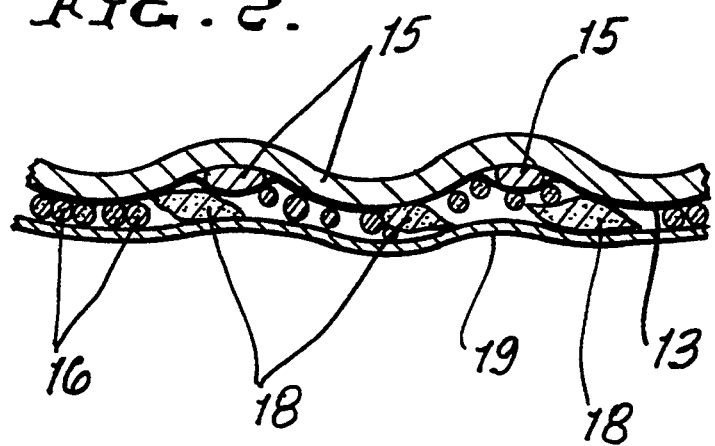
FIG. 2 is a sectional view showing light weight seeding sheet according to present invention.
Figure 3:
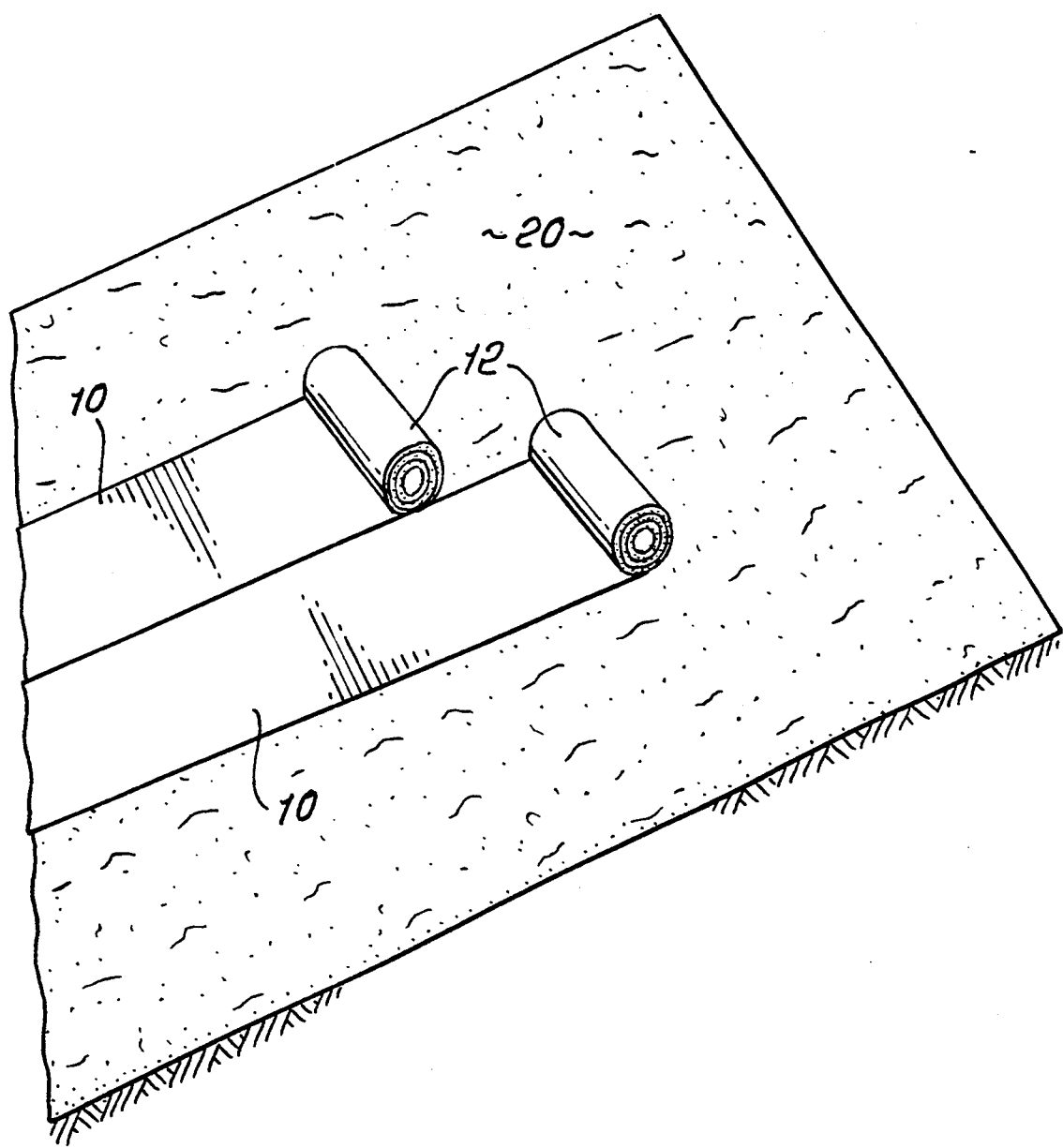
FIG. 3 is a view illustrating use of light weight seeding sheet rolls on a residential yard according to present invention.

Light weight seeding sheet according to the present invention may be described with reference to FIGS. 1 and 2. Light weight seeding sheet 10 for planting of vegetative crops according to the present invention can be manufactured by applying a thin layer of a bonding agent 13 to one face of a flexible reticulate sheet 15, spreading a known quantity of a mixture 16 of seeds, powder fertilizers, and other crop growth compound powders over the bonding agent layer. The light weight seeding sheet may be wound into a roll after the bonding agent layer still exposed to air is thoroughly dried. If the bonding agent used retains its adhesiveness for long periods of time, by absorbing humidity from the air for example, a parting means 19 as shown in FIG. 2 may be placed over the seeded face of the light weight seeding sheet to prevent it from sticking to itself when the light weight seeding sheet is wound into a roll. FIG. 3 shows rolls 12 of the light weight seeding sheet 10 being used to plant grass seeds on a small residential back-yard soil 20. When light weight seeding sheet 10 is unwound as shown in FIG. 3, the side with the seeds and fertilizer particles, which may be covered with parting means 19, should be positioned downward and substantially be in contact with the soil below.

The reticulate sheet used in manufacture of the light weight seeding sheet offered by this invention must be flexible to conform to small hills and valleys of the soil prepared for seeding while still remaining in contact with or remaining in proximity of the soil underneath. The reticulate sheet may be a cloth which may be woven or manufactured by press bonding of fibrous materials, or may be a plastic mesh. It should be permeable to blades of vegetative crops. For annual crops, such as vegetables and grains, the reticulate sheet may best be made of a material that biodegrades in less than a year. For seeding of grass, it would be desirable to have the reticulate sheet to biodegrade after several years, as in the case of burlap for example, to allow time for the grass roots to establish fully to act as soil strengtheners against soil erosion and slide. In either case, a biodegradable reticulate sheet material is preferred over those materials that linger on in the soil for centuries. The reticulate sheet helps control soil, seed, and fertilizer wash-away, provides shade for seedlings, and holds moisture.

It is important that the right amount of seeds, fertilizers and other crop growth additives be bonded uniformly to the reticulate sheet. For planting of grass for example, one cup of selected seed variety may be evenly distributed over a 35 square feet section of the reticulate sheet, along with half a cup of a seedling promoting fertilizer mixture. A good fertilizer mixture may be as follows: 17 parts of nitrogen, 23 parts $P_2O_5$ (phosphoric acid), and 6 parts $K_2O$ (soluble potash). In this fertilizer composition extra phosphorous is provided to help grass seedlings to develop vigorous root systems necessary to thicken the grass.

The parting means 19 that is put over the seeds, fertilizers, and other additive powders to prevent the light weight seeding sheet from sticking to itself when wound into a roll. Parting means should have four important properties. First it must be permeable to seedling roots, second it must be able to serve as a non-bonding layer to prevent the seeding sheet from sticking to itself, third it must be thin so not to add excessive weight to the light weight seeding sheet, and fourth it must be flexible. A water dispersible tissue paper, a water soluble wax coating, a water soluble polymer coating, a layer of sprinkled organic material or mineral particles can all serve as parting means.

The product in accordance with the invention is economical because it is produced with the use of a minimum of raw materials per unit area, and requires only a few simple manufacturing steps. Most importantly the invention addresses the needs of residential backyard consumers with its ability to be cut to any shape using household scissors, ease of handling, ease of transport.

EXAMPLES

I have ascertained by experiment that the light weight seeding sheet as described above is indeed an excellent means by which a residential yard may be seeded. Seeding sheet manufactured by using ordinary burlap cloth as the reticulate sheet, grass seeds and a good starter fertilizer in powder form attached to the reticulate sheet by a sprayed on bonding agent, covered over with a tissue paper acting as parting means was wound into a roll and stored. Three months later, the roll was unwound and the light weight seeding sheet placed over the prepared soil to be seeded. With regular watering to keep the soil moist the seedlings appeared within 7-10 days and eventually produced a healthy, uniform, and vigorous lawn grass. Materials for this experiment were obtained from a hardware store. Burlap cloth was manufactured by Easy gardener, Waco, Tex. The adhesive was a multipurpose spray adhesive by 3M Industrial Specialties Division, St. Paul, Minn. Grass seed was a mixture of two types of rye-grass and bluegrass in approximately equal amounts packaged by The O. M. Scott and Sons Company Marysville, Ohio. Fertilizer mixture contained 17% total nitrogen content from three chemical sources: 4.1% ammoniacal nitrogen, 8.9% urea, and 4% water insoluble nitrogen. Other components of the fertilizer mixture were 23% phosphoric acid ($P_2O_5$), and soluble potash ($K_2O$). The fertilizer mixture was packaged by The O. M. Scott and Sons Company, Marysville, Ohio.

From the foregoing, those skilled in the art will readily understand the nature of the invention and the manner in which it achieves and realizes all of the objectives and capabilities as set forth. The invention is particularly significant from the stand point of its effectiveness for its purposes and its economy and ease of utilization.

While the invention has been described with respect to a certain specific preferred embodiment for purposes of examples, many modifications and variations are possible and it is not intended to limit the invention except as defined in the following claims.

I claim:

1. A light weight seeding sheet unit adapted for easy cutting, handling and transport, and for use in seed planting as well as erosion and weed control, comprising a) a flexible reticulate first sheet in the form of a first layer permeable to penetration by shoot growth from seeds, and characterized as easily cut to shape, said first sheet having opposite sides, b) a bond layer applied to one side of said first layer, c) a mixture of seeds and fertilizer particles applied to said bond layer and evenly distributed in a layer over the area of said bond layer, d) and a thin water soluble parting layer permeable to penetration by roots of vegetative crops, bonded to said reticulate sheet by said bond layer thereby leaving said mixture of fertilizers and seeds between said reticulate sheet and said parting layer to act as a non-bonding surface when said seeding sheet unit is wound into a roll said parting layer consisting of a water soluble wax coating said parting layer having a composition different from that of said first sheet, e) said reticulate sheet consisting of burlap.

2. A light weight seeding sheet as in claim 1, wherein said reticulate sheet is biodegradable.

3. A light weight seeding sheet as in claim 1, wherein said mixture of fertilizers and seeds also contain chemicals helpful for germination and growth of vegetative crops.

* * * * *